United States Patent [19]

Walter

[11] Patent Number: 5,078,446

[45] Date of Patent: Jan. 7, 1992

[54] ARRANGEMENT FOR PROTECTING MOTOR VEHICLES AGAINST THE SUN

[76] Inventor: Dieter Walter, Taunusstrasse 54, D-6453 Seligenstadt 3, Fed. Rep. of Germany

[21] Appl. No.: 488,704

[22] Filed: Mar. 5, 1990

[30] Foreign Application Priority Data

Mar. 10, 1989 [DE] Fed. Rep. of Germany ....... 3907750

[51] Int. Cl.$^5$ ............................................. B60J 11/00
[52] U.S. Cl. ..................................... 296/98; 296/136; 224/331
[58] Field of Search ................................ 296/136, 98; 242/86.5 R, 86.52; 248/298; 224/331, 329, 321

[56] References Cited

U.S. PATENT DOCUMENTS 1,918,423 7/1933 Persinger .............................. 296/98

FOREIGN PATENT DOCUMENTS

| 3500693 | 7/1986 | Fed. Rep. of Germany | 296/136 |
|---|---|---|---|
| 1066784 | 6/1954 | France | 296/98 |
| 1301899 | 7/1962 | France | 224/331 |
| 542853 | 5/1956 | Italy | 296/136 |
| 438980 | 12/1967 | Switzerland | 296/136 |
| 621094 | 1/1981 | Switzerland | 296/136 |

Primary Examiner—Margaret A. Focarino
Assistant Examiner—Gary C. Hoge
Attorney, Agent, or Firm—Max Fogiel

[57] ABSTRACT

A device that protects motor vehicles against the sun, with an oblong cover that extends across the vehicle and is secured by fasteners to a trunk door or rear hatch and that a roller, especially a spring-loaded roller, with protective sheeting rolled up on it rotates below. The protective sheeting, especially sheeting that has been sputtered with aluminum, can be unwound from the roller through a longitudinal opening in the cover against the force of the spring and drawn forward along and over the vehicle and positioned against its front. The fasteners have two caps that demarcate ends of the cover and secure it, each having a bearing on the inside to secure the rotating roller and a base at the bottom, in that each base has an angled section with a side panel that extends more or less in the same plane as the cap and a support that extends in more or less at a right angle below it, and in that each support can be positioned on, especially screwed onto, and removed from a separate positioning plate on the fastener that can in turn be directly secured to the edge of a trunk door or rear hatch.

17 Claims, 5 Drawing Sheets

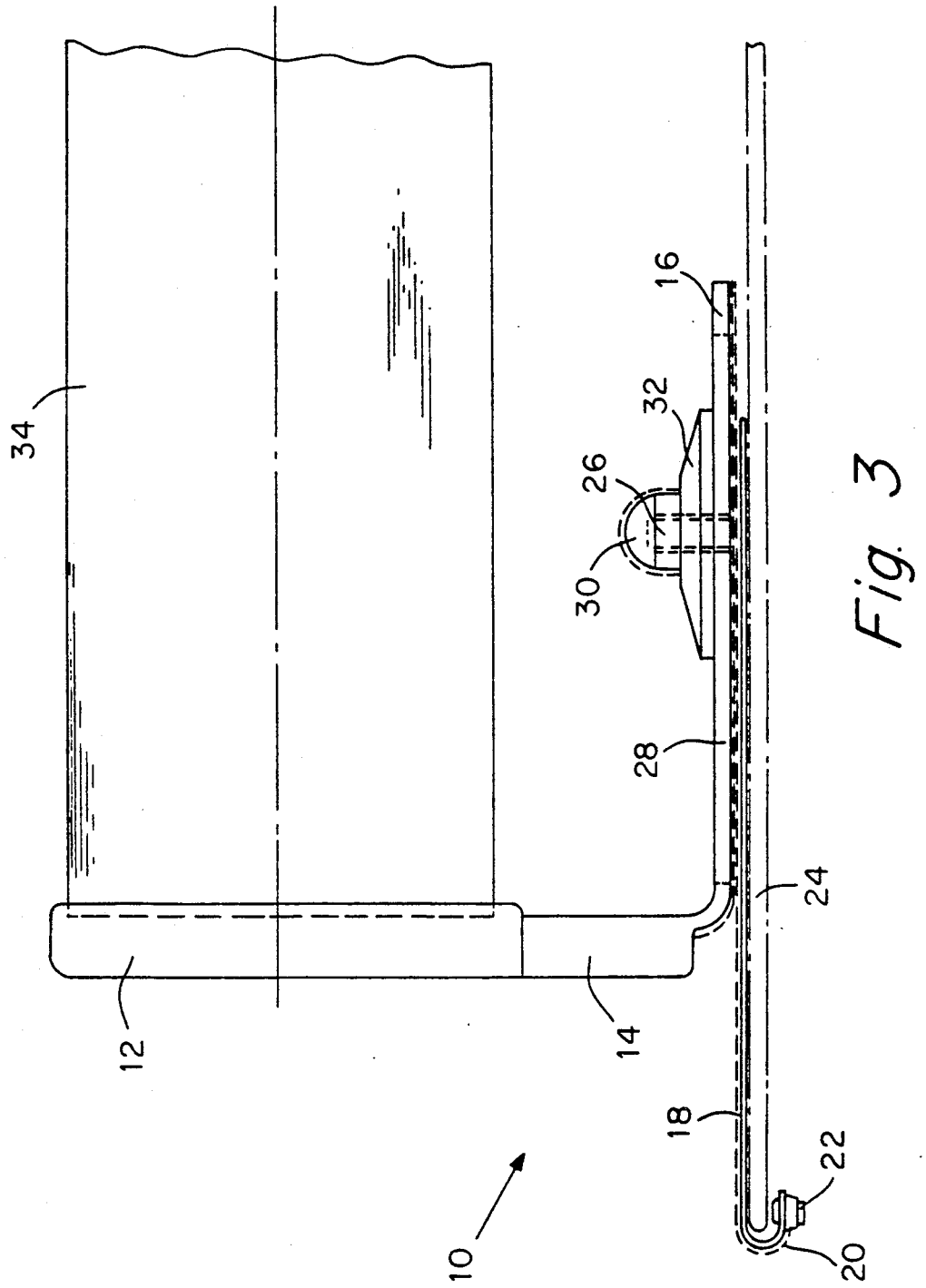

ARRANGEMENT FOR PROTECTING MOTOR VEHICLES AGAINST THE SUN

BACKGROUND OF THE INVENTION

The invention concerns a device that protects against the sun.

The particular drawback of known devices of this type is that they are too complicated to handle and cannot be satisfactorily fastened to a motor vehicle. Another specific problem is that the fasteners must be adaptable to various installation conditions, must not damage the enamel etc., must have an acceptable appearance, must allow rapid installation and removal, and must absolutely ensure completely reliable attachment. These conditions are not being satisfied by known devices that protect against the sun.

SUMMARY OF THE INVENTION

The object of the present invention is to improve a device of the aforesaid type to the extent that it will adapt to different conditions and will be simple and reliable install and remove.

A device that protects against the sun and that will attain the aforesaid object in accordance with the invention is distinguished by the characteristics. Since the device extends in any case across the width of the vehicle, it is extremely practical for the fasteners to perform multiple functions, specifically demarcating the front of the cover, storing the roller and protective sheeting, and securing the overall device to the vehicle. The result is a very compact, space-saving, lightweight, and cost-effective device that can be very securely fastened immediately adjacent to the outer fasteners to the lateral edges of the top of a trunk door or rear hatch by holders without attracting much attention. The bases of the fasteners can be removed from the holders and have an extensive enough contact surface to ensure reliable fastening with sufficient space between the cover and the vehicle components. The present invention prevents injury from the components of the vehicle where the device is fastened to it. Since the material is secured with screws to the inner surface of the edge of a trunk door or rear hatch and since there are no such connectors as tensioning strips between the fasteners at both ends of the device, the design is especially appealing, inconspicuous, that is, as well as being extremely stable and multifunctional. Since the positioning plate can be shaped, bent for example, with a crimped securing edge, the fasteners can easily and rapidly be adapted to practically all installation conditions.

Also extremely practical is the arrangement which extensively facilitates adaptability to the precise width of a trunk door or rear hatch, eliminating the need to keep too many devices of differing width in stock.

Another embodiment is practical in terms of adjusting to different widths. It allows the device to be rapidly and reliably secured between the support and the positioning plate.

Further embodiments not only ensure reliable attachment of the device that protects against the sun in that vulcanized or coated surfaces can be secured better but also increase passenger safety in that the edges of metal components are covered up. The appearance of the fasteners is also improved and their resistance to environmental factors improved and their life accordingly extended.

Embodiments are provided to ensure a reliable, stable, and easy-to-establish attachment between the cover and the fasteners.

Variations in the design of the cover are provided for various applications.

One embodiment is preferred because among other reasons it allows optimal industrial-scale manufacturing of covers of different length.

Additional embodiments provide very simple ways of ensuring a stable, releasible, and cushioned stop for the terminal strip once the protective sheeting has been rolled up. The longitudinal opening in the cover is simultaneously closed up to the extent that it is not intended to be open at the bottom.

Also very practical is an embodiment with it side panels that allow the side windows to be effectively covered up. Once the device has been rolled in, the lateral components are forced back against the main path of the protective sheeting and secured in that position by Velcro-type barbed- and looped-pile tape or a similar structure. Once the protective sheeting has been opened out, the lateral components are folded down and secured by any type of attachment to the vehicle such that they cannot be blown upward by the wind etc.

BRIEF DESCRIPTION OF THE DRAWINGS

Embodiments of the invention will now be described with reference to the drawings, wherein FIG. 3 is a schematic side view of one end of the device.

FIG. 4b is a second view of the fastener with cap shown in FIG. a;

FIG. 4c is a third view of the fastener with cap shown in FIG. 4a;

DESCRIPTION OF THE PREFERRED EMBODIMENTS

Figure 1:
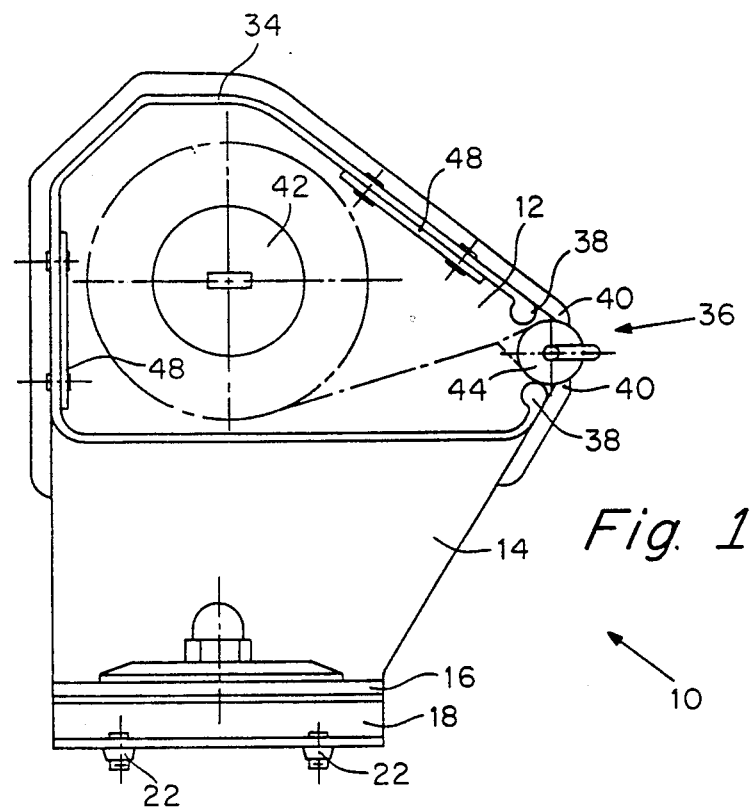
FIG. 1 is a section through a device that protects against the sun in accordance with the invention accompanied by a view of a fastener at one end.

The fasteners 10 illustrated in FIGS. 1 through 5 have caps 12 at the ends of a device that protects against the sun with side panels 14 in more or less the same plane, acting as spacers, and bent inward into supports 16. The purpose of the supports is to secure the components to a positioning plate 18 on each fastener 10. Positioning plate 18 has an outer securing edge 20 flanged 180° with two tensioning screws 22 in the present case through its outer edge.

As will be evident from the schematic illustration in FIG. 3, positioning plate 18 can accordingly be easily fastened by means of threaded bolts 22 to the outer edge of the door 24 of a trunk or to that of a rear hatch on a motor vehicle.

Support 16 is secured to positioning plate 18 with a threaded bolt 26 that extends through a slot 28 in support 16 and can be tightened with a nut 30, a capped nut for example, and an expansion washer 32. The nut is preferably provided with an antitheft mechanism 68 that can be activated. Since not only the components of the fastener that engage each other under tension but also the bottom of positioning plate 18 are preferably vulcanized, the engagement is both secure and will not damage any parts of the vehicle. The slot facilitates varying the distance between the securing edges 20 of the two positioning plates 18. The device can also very easily and rapidly be removed from or mounted on positioning plate 18.

Figure 2:
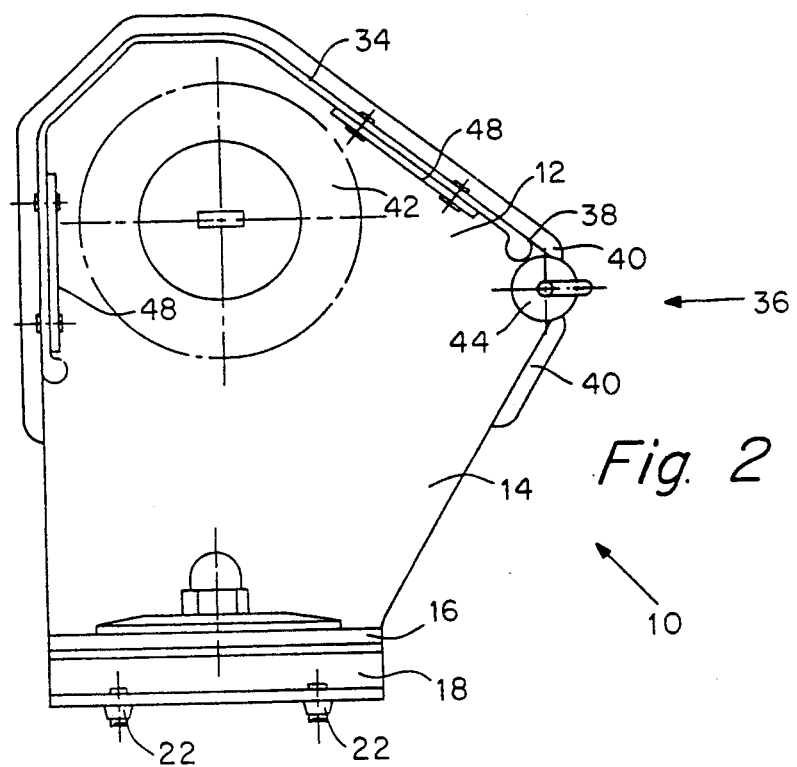
FIG. 2 is a view similar to that in FIG. 1 but with a different type of cover, specifically one that is open at the bottom.

The cover 34 in FIG. 1 has a continuous housing-like cross-section with a narrow longitudinal opening 36 for extracting the protective sheeting. It can for example be a length of extruded aluminum structural section. The cover 34 illustrated in FIG. 2 is open at the bottom. The cover has demarcating beads along its longitudinal edges. Extending out of longitudinal opening 36 at the caps 12 on fasteners 10 is a recess 50 with rubberized borders 40 that narrow the recess to some extent on the intake side. A terminal strip 44 should accordingly, once the protective sheeting has been rolled up on a roller 42, be cushioned and secured in position for the time being. Roller 42 extends below or inside cover 34 with one end engaging bearings 46 on caps 12. FIGS. 1 and 2 represent the protective sheeting in the rolled-up state with the circular-cylindrical terminal strip 44 secured in the recesses 50 in caps 12 and closing off the longitudinal opening 36 in cover 34 as illustrated in FIG. 1.

Figure 4A:
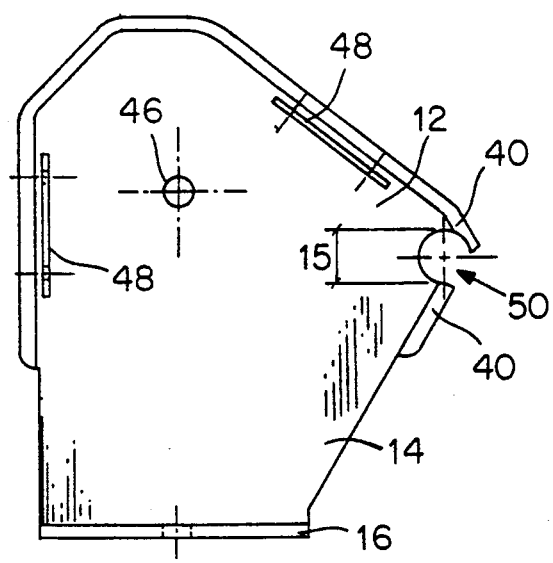
FIG. 4a is a first view of one part of a fastener with a cap.
Figure 4B:
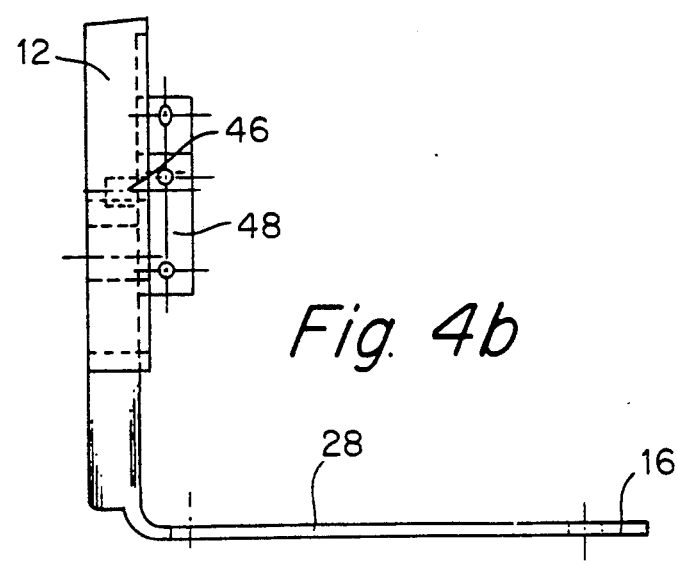
Figure 4C:
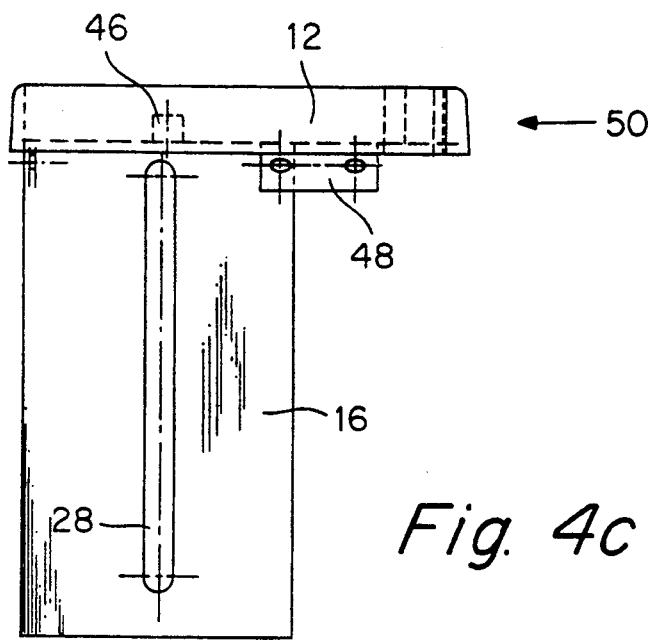

It will be obvious from FIG. 4 that the caps 12 on fasteners 10 have two striplike elevations 48 that project inward and that cover 34 can be slid over. The cover can be permanently secured to the caps by riveting or screwing it to the elevations.

It will be evident from the figures that caps 12, including side panels 14, are relatively compact. This is because one edge of each cap 12 slightly covers the end of cover 34 and because these outer components are especially thoroughly vulcanized to prevent injury to the passengers and damage to any articles that may come into contact with them.

Figure 5:
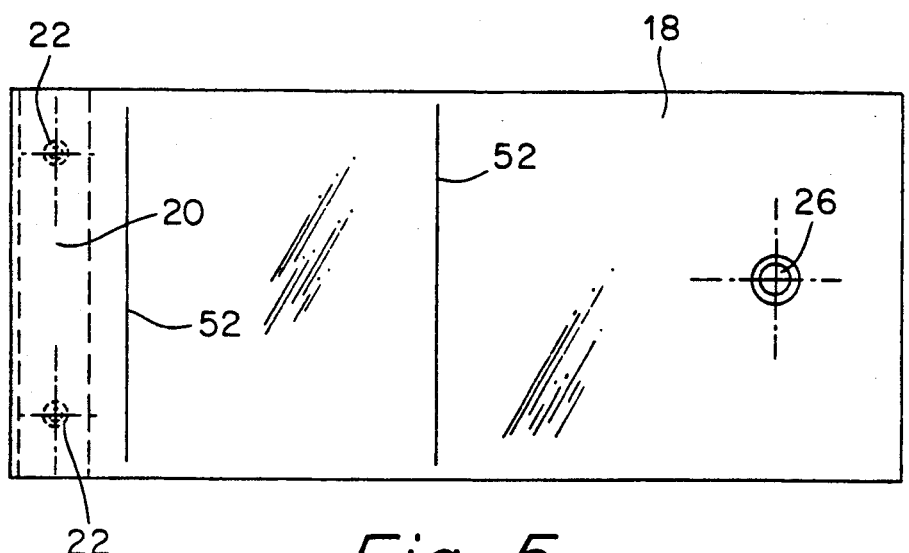
FIG. 5 illustrates the second part of the fastener.

FIG. 5 illustrates how positioning plate 18 can have notches 52 at one or more points to match the shape of positioning plate 18 to the door of a trunk door or rear hatch. Positioning plate 18 can for this purpose have any shape, even rounded, to ensure a tight fit. This is extremely important for a secure and safe mount.

Figure 6:
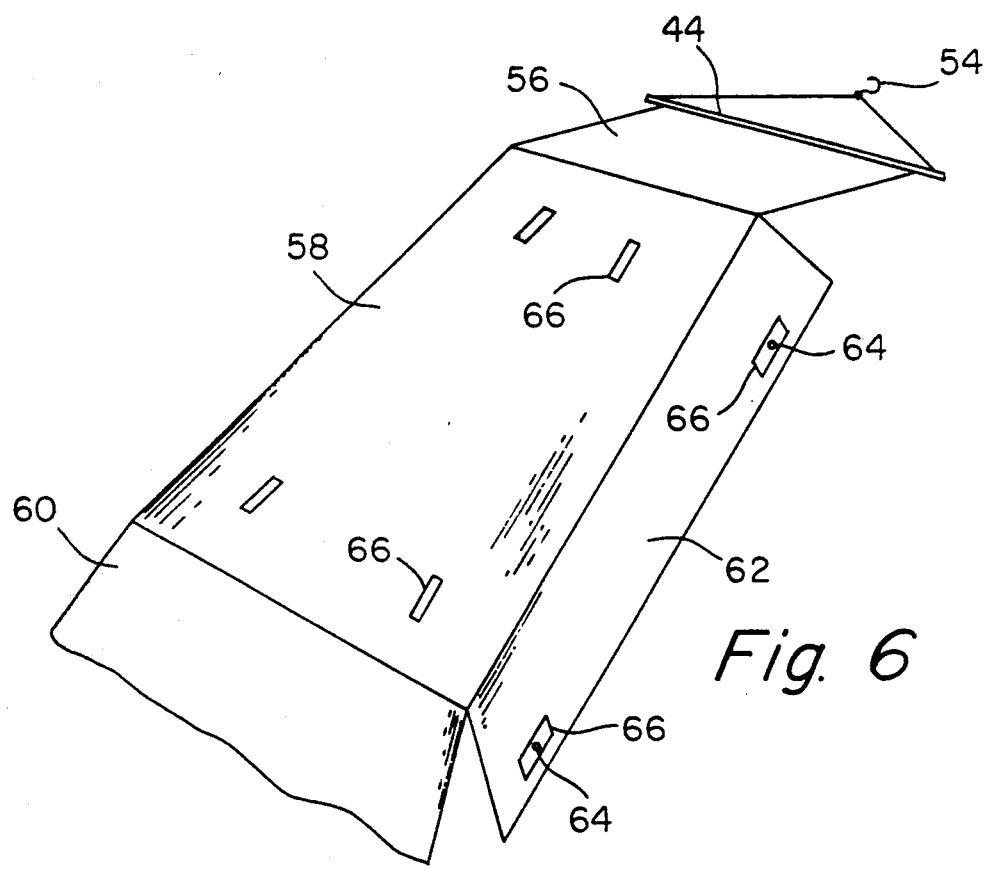
FIG. 6 is a schematic perspective view of the extended protective sheeting.

The extended protective sheeting illustrated in FIG. 6 has a forward section 56, a midsection or roof 58, and a rear section 60. Mounted on forward section 56, which protects the windshield and optionally other forward parts of the vehicle, is terminal strip 44 along with a hooked securing device 54 or similar structure, temporarily attaching to the front bumper for instance. Adjacent to midsection or roof 58 are sides 62 that cover the side windows. When not in use, the sides fold up against the main section of the protective sheeting, where they are secured with Velcro-type barbed- and looped-pile tape 66. In this particular context sides 62 have securing structures in the form of eyes 64, to which can be attached means of securing the sides in position during use. These structures can for example be bungees or similar devices that secure them to wheel cases, lateral mirrors, etc.

The invention claimed is:

1. An arrangement for protecting motor vehicles against the sun comprising: an oblong cover extending across a vehicle with a trunk door or rear hatch; fasteners for securing said cover to said trunk door or rear hatch; a spring-loaded roller with spring action and with protective sheeting wound on said roller; said protective sheeting being sputtered with aluminum, and being unwindable from said roller through a longitudinal opening in said cover against said spring action and drawn forward along and over the vehicle and positioned against a front side of the vehicle; said fasteners having two caps demarcating ends of the cover and securing said cover; each cap having a bearing inside said cover for securing said roller and having a base member with a side panel extending substantially in a plane with said cap; a support extending substantially at a right angle below said side panel; a separate positioning plate on each fastener and securable directly to an edge of the trunk door or rear hatch, said support being screwed onto said positioning plate, said positioning plate being shaped to match the trunk door or rear hatch and being tightly securable to said trunk door or rear hatch; a flanged securing edge on said positioning plate and at one side of said positioning plate; at least one tensioning screw for securing said flanged edge to an edge of the door or hatch; each cap being directly connected with said base member and said cover; said support and said positioning plate being displaceable relative to one another and being securable together.

2. An arrangement as defined in claim 1, wherein said support has a slot; and a threaded bolt on said positioning plate and extending through said slot.

3. An arrangement as defined in claim 2, including a capped nut on top of an expansion washer for holding said support and said positioning plate securely together.

4. An arrangement as defined in claim 1, wherein said cap has an outside, said support has a bottom, and said positioning plate has two sides; and a plastic coating on at least said outside of said cap, at least said bottom of said support, and said two sides of said positioning plate.

5. An arrangement as defined in claim 4, wherein said fasteners have outer surfaces covered with plastic.

6. An arrangement as defined in claim 1, wherein said caps are removably fixed to said cover.

7. An arrangement as defined in claim 1, wherein said caps have elevations on an inside surface for centering and positioning said cover.

8. An arrangement as defined in claim 7, wherein said elevations comprise longitudinal securing strips resting against inside said cover.

9. An arrangement as defined in claim 1, wherein said cover comprises a closed housing with a substantially narrow longitudinal opening.

10. An arrangement as defined in claim 1, wherein said cover is open at a bottom side of said cover.

11. An arrangement as defined in claim 9, wherein said cover comprises a length of extruded structural section of aluminum.

12. An arrangement as defined in claim 9, wherein each cap has a rubberized recess in alignment with said longitudinal opening, said longitudinal opening having a substantially narrow entry for providing a snap-in and cushioning means for a round terminal strip on said protective sheeting.

13. An arrangement as defined in claim 12, wherein said terminal strip closes said longitudinal opening in said cover.

14. An arrangement as defined in claim 1, wherein said protective sheeting has fold-up sides at two longitudinal edges of said sheeting; and means for securing said fold-up sides against a main section of said sheeting when not in use.

15. An arrangement as defined in claim 14, wherein said means for securing said fold-up sides comprises fastening means.

16. An arrangement as defined in claim 1, wherein said cap has an outside surface, said support has a bottom, and said positioning plate has two sides, at least said outside surface of said cap, at least said bottom of said support, and said two sides of said positioning plate being vulcanized.

17. An arrangement as defined in claim 16, wherein said fasteners have vulcanized outer surfaces.

* * * * *